(No Model.)
W. W. BRIGG.
COTTON GIN.
No. 324,646. Patented Aug. 18, 1885.
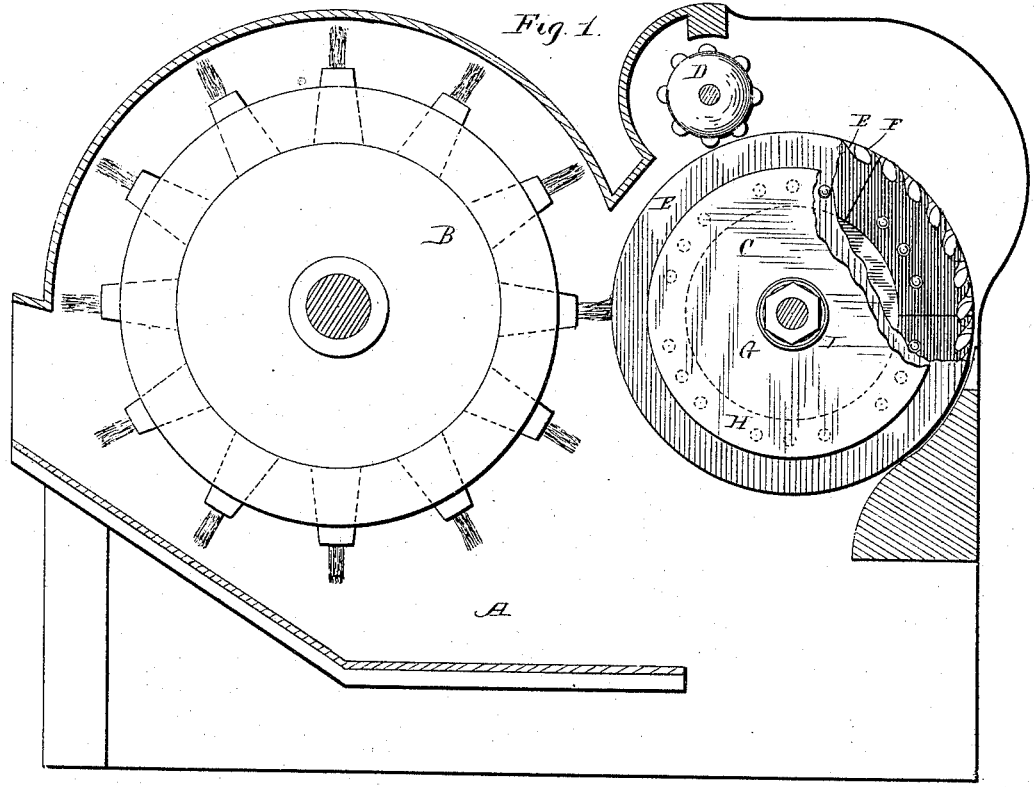
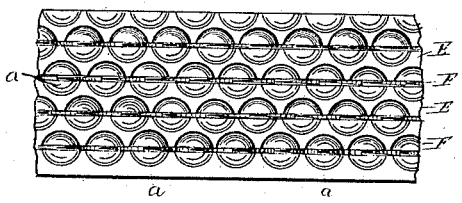
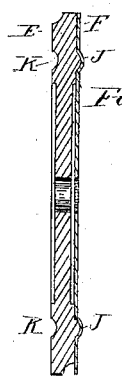
WITNESSES:
W. T. Robertson.
O. B. Hillyard.
INVENTOR
Wm W Brigg
BY T. J. W. Robertson
ATTORNEY

UNITED STATES PATENT OFFICE.

WILLIAM WHITELEY BRIGG, OF WASHINGTON, D. C., ASSIGNOR OF ONE-THIRD TO EDWARD A. BLAKELY, OF NEW ORLEANS, LA.

COTTON-GIN.

SPECIFICATION forming part of Letters Patent No. 324,646, dated August 18, 1885.

Application filed September 13, 1884. (No model.)

*To all whom it may concern:*

Be it known that I, WILLIAM W. BRIGG, a citizen of the United States of America, residing at Washington, in the District of Columbia, have invented certain new and useful Improvements in Cotton-Gins, of which the following is a specification, reference being had therein to the accompanying drawings.

This invention relates to an improvement in cotton-gins; and it consists in the peculiar construction and arrangements of parts hereinafter more particularly described and claimed.

In the accompanying drawings, Figure 1 represents an elevation of a cotton-gin constructed according to my improvement with one of the sides removed and part of the cylinder broken away. Fig. 2 is a plan of a portion of a cylinder, and Fig. 3 a cross-section of a spacing block and saw.

Referring now to the details of construction, A represents the frame of a cotton-gin; B, the brush-cylinder; C, the saw-cylinder, and D a revolving ribbed stripper, all of which may be made of any approved form, excepting the saw-cylinder, for it is in the latter only that my improvement lies.

In constructing my saw-cylinder, I use a series of spacing-blocks, E, preferably made of paper or papier-maché, and a corresponding series of saws, F, which may either be made in one piece, as ordinary saws usually are, or in sections, as shown in the drawings, which is the preferable plan, because in case of damage to the teeth (which, however, is very unlikely in my arrangement) a new section can be substituted without the necessity of using an entire new saw. The edges of each block E are provided with semicircular recesses set "staggering," so that a recess on one edge of the block will be between two recesses on the opposite edge, as clearly shown in Fig. 2, so that when a series of blocks and saws are assembled together they will form a cylinder having in its face a series of concave recesses, a, of circular outline, in each of which recesses is a tooth of a saw, which tooth I prefer to set either flush with or a little below the face of the cylinder, so that said tooth will thus be fully protected from injury from an accidental blow or from coming in contact with some hard substance in the cotton, such as hulls and branches of the cotton-plant, pebbles, flint, &c. These saws and blocks are preferably secured on a shaft, G, by means of heads H on each end, which heads are secured on the shaft in any desirable manner; but I prefer to use nuts I screwed on the end of each shaft against said heads, by which means all the blocks and saws may be securely fastened together and caused to turn with the shaft.

The saws and blocks should be provided with some means for keeping them in their proper relative position, and I prefer for this purpose to provide each saw and each block with projections J on one side and recesses K on the other, so that a projection on a saw will enter a recess in the next adjacent block, and a projection on this block will enter a recess in the saw on its opposite side.

The spacing-blocks I prefer to make, as before described, of paper-pulp, as this material is peculiarly fitted for the purpose. Metal spacing-blocks, besides being too costly, are too heavy, and, wood, aside from its being subject to shrinkage and warping, is unfitted for the purpose because the lint will catch in the grain of the wood, and thus prevent the proper operation of the machine. I do not limit myself, however, to the use of paper-pulp alone, as other material may be incorporated with it without departing from the spirit of my invention.

Spacing-blocks of paper-pulp, although advantageous for other forms of gin-saw cylinders, on account of their non-liability to shrink or warp, are peculiarly adapted for saw-cylinders of the form shown, as well as others where the blocks do not extend outward to the periphery of the saws, as in those gins intended for ginning sea-island or long-stapled cotton, because as there are no ribs to keep the seed-roll in position, as in other gins, it is necessary to have these blocks large enough in diameter to extend to near the roots of the teeth of the saws, and if the peripheries of these blocks presented a rough surface to the seed-roll, in its revolution on and against saws and blocks, the latter, although below the saw-teeth, would, by reason of their rough surfaces, if made of wood, catch on and drag or pull from the seed-roll portions of lint which no brush could disengage, but would pack said lint more closely with every revolution and to such an extent as would necessitate the suspension of the ginning operation until these accumulations were removed.

Metal and other materials have been substituted for wood spacing-blocks; but their weight and expense renders such materials objectionable, whereas blocks made from paper-pulp or from compositions in which it forms an essential part, will be found to be very light and much cheaper than metal or even wood, because they can be readily molded into any desired shape.

What I claim as new is—

1. A cylinder for cotton-gins provided with a series of independent spacing-blocks having recesses formed in the junction of their sides and peripheries for the teeth of the saws, substantially as described.

2. A roller for cotton-gins, provided with a series of saws and a series of spacing-blocks, the latter having recesses set staggering on opposite sides of each block, and the saws arranged one on either side of said blocks with their teeth set opposite to the recesses in the blocks, substantially as described.

3. A spacing-block for cotton-gins made of paper having a series of recesses formed on its periphery, substantially as described.

In testimony whereof I affix my signature, in presence of two witnesses, this 19th day of August, 1884.

WILLIAM WHITELEY BRIGG.

Witnesses:
T. J. W. ROBERTSON,
H. B. ZEVELY.